(12) United States Patent
Maurincomme et al.

(10) Patent No.: US 6,879,711 B2
(45) Date of Patent: Apr. 12, 2005

(54) METHOD OF AUTOMATIC REGISTRATION OF THREE-DIMENSIONAL IMAGES

(75) Inventors: Eric Maurincomme, Chevreuse (FR); Erwan Kerrien, Nancy (FR)

(73) Assignee: GE Medical Systems SA, Buc (FR)

( * ) Notice: Subject to any disclaimer, the term of this patent is extended or adjusted under 35 U.S.C. 154(b) by 749 days.

(21) Appl. No.: 09/737,878

(22) Filed: Jun. 25, 2001

(65) Prior Publication Data

US 2001/0036303 A1 Nov. 1, 2001

(30) Foreign Application Priority Data

Dec. 2, 1999 (FR) .......................................... 99 15207

(51) Int. Cl.[7] .............................................. G06K 9/00
(52) U.S. Cl. ....................... 382/128; 128/922; 382/151; 378/4; 378/21
(58) Field of Search ................................ 382/129, 130, 382/131, 151, 154, 128, 132; 128/922; 345/653, 664, 679, 757; 378/4, 21, 22, 23, 24, 25, 26, 27

(56) References Cited

U.S. PATENT DOCUMENTS

| | | | | |
|---|---|---|---|---|
| 4,770,182 A | * | 9/1988 | Damadian et al. | 600/410 |
| 5,531,520 A | * | 7/1996 | Grimson et al. | 3872/132 |
| 5,560,360 A | * | 10/1996 | Filler et al. | 600/408 |
| 6,272,370 B1 | * | 8/2001 | Gillies et al. | 600/411 |

OTHER PUBLICATIONS

Yung–Nien Sun et al. ("Fast registration technique of MR and SPECT brain images", Department of Computer Science and Information Engineering, National Cheng Kung University, Tainan, Taiwan, Republic of China; Feb. 1998).*

Launay, "Localization and 3D reconstruction from stereotaxic angiograms", doctoral thesis, National Polytechnic Institute of Lorraine, Nancy, France 1996.

Sun, Y–N et al, "Fast Registration Technique of MR and Spect Brain Images", Proc. of the SPIE–Int. Soc. Opt. Eng., V. 3338 Feb. 1998 p. 1442–1449.

Amdur, R.J. et al, "Prostate Seed Implant Quality Assessment Using MR and CT Image," Int. Journal of Radiation Oncology Biology Physics, vol. 43, No. 1, Jan. 1999, p. 67–72.

Mehran, Moshfeghi et al, "Three–Dimensional Registration of Multi–Modality Medical Images Using the Principal Axis Technique", Philips J. of Research, NL, Elsevier, Amsterdam v. 47, No. 2, 1992, p. 81–97.

* cited by examiner

Primary Examiner—Samir Ahmed
Assistant Examiner—Anand Bhatnagar
(74) Attorney, Agent, or Firm—Jay L. Chaskin; Cantor Colburn LLP

(57) ABSTRACT

Method of automatic registration of three-dimensional images making possible visualization of the blood vessels, by comparison of a three-dimensional digital image obtained by means of a radiology apparatus and a three-dimensional digital image obtained by means of a nuclear magnetic resonance apparatus, in which, from a point of correspondence between the two three-dimensional images, an estimate is made by processing of the projected two-dimensional images of a rotation capable of registering the two three-dimensional images, then an estimate is made by processing of the projected two-dimensional images of a translation capable of registering the two three-dimensional images, and one of the two three-dimensional images is registered in relation to the other.

13 Claims, 7 Drawing Sheets

METHOD OF AUTOMATIC REGISTRATION OF THREE-DIMENSIONAL IMAGES

BACKGROUND OF THE INVENTION

The present invention concerns the field of image processing, particularly of three-dimensional radiological images.

As is known, radiological apparatuses comprise a means of emission of an X-ray beam such as an X-ray tube and a means of reception of the beam, such as a solid state detector or even a scintillator and a video camera, of CCD type, for example.

The means of emission and the means of reception of X-rays are generally supported by a mobile system with one or more axes, making it possible to take pictures at different angles of incidence. The means of reception of the X-ray beam is connected to image processing means making possible the generation of so-called 3DXA three-dimensional images from a series of two-dimensional images picked up by the means of reception, these two-dimensional images being representative of the group of structures crossed by the X-rays. In a 3DXA three-dimensional image, the voxels are isotropic and have a dimension in the order of 300 μm. In angiography applications, the 3DXA images make it possible to see the blood vessels which are injected with contrast medium, but the other tissues can hardly be distinguished.

The nuclear magnetic resonance apparatuses comprise means of sectional imaging, an image being representative of the proportion of water present in the structures observed. From a series of such so-called MR images taken along different cutting planes displaced in translation and/or in rotation, it is known how to reconstruct a so-called 3DMR three-dimensional image. In a 3DMR three-dimensional image, the voxels are anisotropic, that is, capable of having different dimensions along the axes of a three-dimensional mark. The resolution is in the order of one millimeter. In angiography, applications the 3DMR images make it possible to see the blood vessels and other tissues.

It is important to obtain a good match between a 3DXA image and a 3DMR image in order to refine the knowledge of the structures observed, notably, of the blood vessels in their environment.

Such a match can be obtained by external markers, use of which is constraining and creates risks of errors.

The present invention is an improved method of registration.

The present invention also concerns a method of registration of millimetric or submillimetric precision with short calculation time.

The automatic registration method in an embodiment of the invention is intended for three-dimensional images making possible a good visualization of the blood vessels.

SUMMARY OF THE INVENTION

A three-dimensional digital angiography image obtained by means of a radiology apparatus and a three-dimensional digital image obtained by means of a nuclear magnetic resonance apparatus are compared. From a point of correspondence between the two three-dimensional images, an estimate is made by processing of the projected two-dimensional images of a rotation capable of registering the two three-dimensional images, then one of the two three-dimensional images is registered in relation to the other, an estimate is made by processing of the projected two-dimensional images of a translation capable of registering the two three-dimensional images, and one of the two three-dimensional images is registered in relation to the other.

The two-dimensional images are obtained by projection of the three-dimensional images.

In one embodiment, an estimate is made again by processing of the projected two-dimensional images of a rotation capable of registering the three-dimensional image registered in relation to the other three-dimensional image, then the registered three-dimensional image is registered in relation to the other or the reverse, an estimate is made by processing of the projected two-dimensional images of a translation capable of registering the three-dimensional image registered in relation to the other three-dimensional image, and the registered three-dimensional image is registered in relation to the other or the reverse. The weaker resolution image will preferably be registered in relation to the stronger resolution image.

Preferably, the point of correspondence between the three-dimensional image is chosen manually or automatically on a blood vessel.

The rotation estimate treatment advantageously comprises stages of:

selection of the voxels of each three-dimensional image, lying between an outer surface and an inner surface, both surfaces embracing the point of correspondence.

radial projection on a spherical surface of voxels of maximum intensity among the voxels selected for each three-dimensional image, generation of a two-dimensional image for each three-dimensional image, by projection on a plane in a three-dimensional mark centered on the point of correspondence in order to flatten the sphere, calculation of the correlation between the two-dimensional images projected with zero angular displacement, followed by a positive and then negative angular displacement along each axis of the three-dimensional mark, determination of the angular displacement around the three axes of the mark of the three-dimensional space presenting the maximum correlation between the two-dimensional images.

In one embodiment, the rotation estimate treatment comprises stages of reiteration of the two stages of calculation of the correlation and calculation of the angular displacement for a displacement of a small number of pixels.

In one embodiment, the outer and inner surfaces comprise concentric spherical parts. The center of the spheres can be the point of correspondence.

Each outer or inner surface advantageously comprises a truncated cone-shaped part, the vertex of the cone being the point of correspondence. The intersection of the cone and of a sphere defines a small circle of the sphere which limits the spherical part and the truncated cone by defining its base.

In one embodiment, the direction of the cone is a circle, for example, placed in a plane perpendicular to a straight line passing through the center of the circle and the point of correspondence.

The translation estimate treatment advantageously comprises stages of:

selection of voxels of each three-dimensional image, included in a parallelepiped of given dimensions, centered on the point of correspondence, projection along three axes of a same three-dimensional mark, centered on the point of correspondence, of voxels of maximum intensity among the voxels selected for each three-dimensional image, generating three two-dimensional images for each three-dimensional image, the projection preferably being along parallel lines, calculation of the correlation between each pair of two-dimensional images projected along the same axis with zero displacement, followed by a positive and then negative displacement, of a given number of pixels along each axis of the plane of each two-dimensional image, calculation of the average correlation for each displacement, calculation of the translation displacement between the three-dimensional images corresponding to the displacement presenting the maximum average correlation between the two-dimensional images. The parallelepiped can be a cube, for example, of 16 mm per side. The side of a voxel being different in 3DXA and in MRI, if the cube has 64 voxels in 3DXA, it will encompass fewer voxels in MRI, if it is desired that both cubes be of the same size.

In one embodiment, the translation estimate treatment comprises stages of reiteration of both stages of calculation of the correlation and calculation of the translation displacement at a lower pitch for a lesser displacement.

In other words, a registration of two three-dimensional images is made by means of processing of two-dimensional images resulting from projections of the three-dimensional images. One thus avoids direct processings of three-dimensional images, which would be slow and expensive. The use of external markers can be avoided. After obtaining the necessary two-dimensional registration, the corresponding three-dimensional registrations can be deduced therefrom.

BRIEF DESCRIPTION OF THE DRAWINGS

The present invention will be better understood by study of the detailed description of an embodiment taken by way of nonlimitative example and illustrated by the attached drawings, in which.

DETAILED DESCRIPTION OF THE DRAWINGS

Three-dimensional reconstructions of blood vessels called "3DXA" have been used recently from rotational angiography sequences made by rapid rotation of the X-ray tube and of the camera over half a turn and the taking of about fifty DSA images, which are the projections on input of a tomography algorithm producing the 3DXA image on output. For more information on this technique, reference is made to Launay, "Localization and 3D reconstruction from stereotaxic angiograms," doctoral thesis, National Polytechnic Institute of Lorraine, Nancy, France, 1996.

"DSA image" means here the image of maximum opacification up to row N in the acquired sequence, that is, each pixel of the resultant image takes the smallest value encountered on the N first images of the sequence, or the image of row N in the acquired sequence. Row N of the image is either chosen by the user or fixed in relation to the rate of acquisition.

These reconstructions make possible a very good appreciation of angioarchitecture. Furthermore, those three-dimensional images can be used in real time according to several types of visualization, such as maximum intensity projection, isosurface, volume melting, virtual endoscopy or even reformatted cross-section, and are a further assist to the diagnoses of practitioners.

The invention makes possible a matching of 3DXA images and 3DMR images.

The radiology machine, once calibrated, supplies an initial registration which differs from the registration sought of perfect re gistration by a rigid transformation (rotation+translation) in three-dimensional space.

Figure 1:
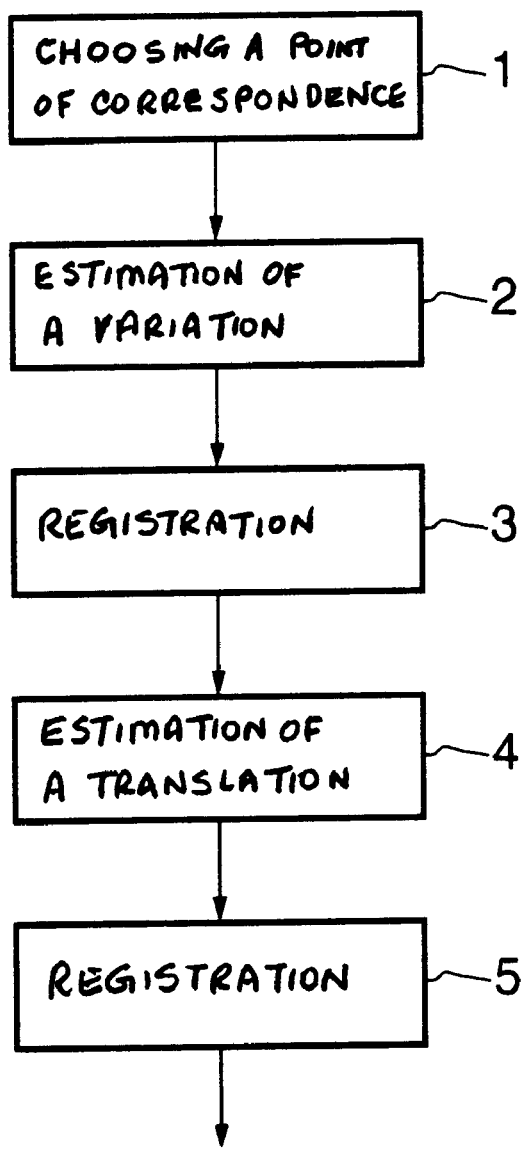
FIG. 1 is a diagram of stages of a process according to one embodiment of the invention.

As can be seen in FIG. 1, registration of the three-dimensional images begins with a stage 1 of choice of a point of correspondence between a three-dimensional digital image composed of a matrix of voxels and obtained by means of an X-ray apparatus and of a three-dimensional digital image also composed of a matrix of voxels and obtained by means of a nuclear magnetic resonance imaging (MRI) machine. To date, the choice of point of correspondence has been made by an operator. However, automation of that task could be envisaged.

The operator is going to choose a point which seems to be seen with precision on each of the two images. In angiography, the first image of 3DXA type makes the blood vessels stand out. The second image of 3DMR type makes both the blood vessels and the other neighboring tissues stand out. The operator will therefore choose as point of correspondence a point of a blood vessel which is then precisely visible on both images at the same time. It can be estimated that the precision of choice of the point of correspondence is in the order of 1 to 2 mm. The operator may make that choice by displacement of a cursor on one after the other of the three-dimensional images displayed on the screen by means of a mouse, a ball, a keyboard or any other suitable means of controlling a cursor.

That stage 1 being completed, the operator launches the automatic registration proper, which begins with a stage 2 of estimate of a rotation defined by three angles of rotation on three axes of a three-dimensional mark, the origin of which is the point of correspondence chosen in stage 1. At the end of stage 2, three angles noted $\theta$, p and $\phi$ are then known, making possible an angular registration between the two three-dimensional images.

One then goes on to a stage 3 in which the registration defined by the three angles $\theta$, p and $\phi$ are applied to one of the two three-dimensional images. Registration can be carried out on the 3DXA image as well as on the 3DMR image.

In stage 4, an estimate is made of a translation capable of registering the three-dimensional images previously registered angularly in relation to one another. The translation is defined by three coordinates X, Y and Z on each of the three axes of a three-dimensional mark, the origin of which is the point of correspondence. The mark is advantageously the same as that used in stage 2 for rotation.

In stage 5, one applies the registration in translation defined by the coordinates (X, Y, Z) to one of the two three-dimensional images. Two mutually registered images are thus obtained, which therefore present an improved correspondence between their voxels and make possible a better assessment of the patient's anatomy and, in the case of angiography, of the position of the blood vessels relative to the adjoining tissues.

Figure 2:
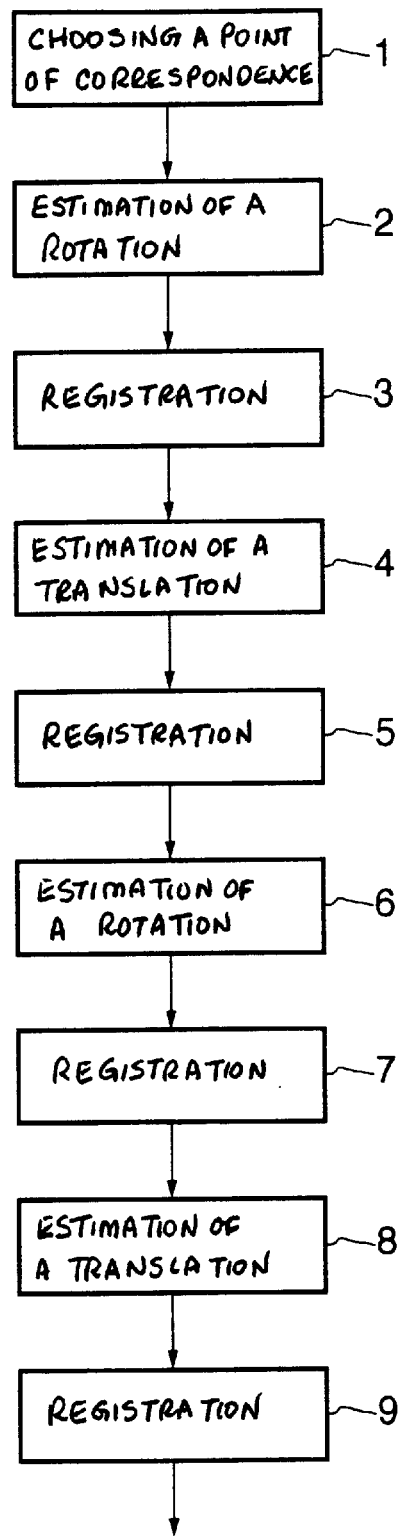
FIG. 2 is a diagram of stages of a process according to another embodiment of the invention.

In the embodiment illustrated in FIG. 2, process stages 6 to 9 have been added to stages 1 to 5 described above. In fact, the estimate of displacement, on rotation as well as on translation, is made by comparison of the correlation calculated from two-dimensional images and emanating from the 3DXA and 3DMR three-dimensional images and from the correlation between the same two-dimensional images but shifted, either on rotation in stage 2 or on translation in stage 4, by a slight displacement, for example, of 4 pixels on translation and by choice of the displacement conferring the maximum correlation, knowing that from the displacement between the two-dimensional images it is possible to calculate a displacement on rotation as well as on translation between the 3DXA and 3DMR three-dimensional images.

It is therefore particularly important to repeat the stages 2 to 5 illustrated in FIG. 1, with a recommended lesser displacement so as to increase the precision of registration. Thus, stages 6 to 9 illustrated in FIG. 2 are identical to stages 2 to 5, with the exception that the rotation in stage 6 and translation in stage 8 are estimated with a greater precision, for example, twice as great.

Depending on the desired precision of registration, the block of four stages can be reiterated once more with an ever greater precision, until obtaining a subpixelic registration on the two-dimensional images originating from the 3DXA and 3DMR three-dimensional images.

Figure 3:
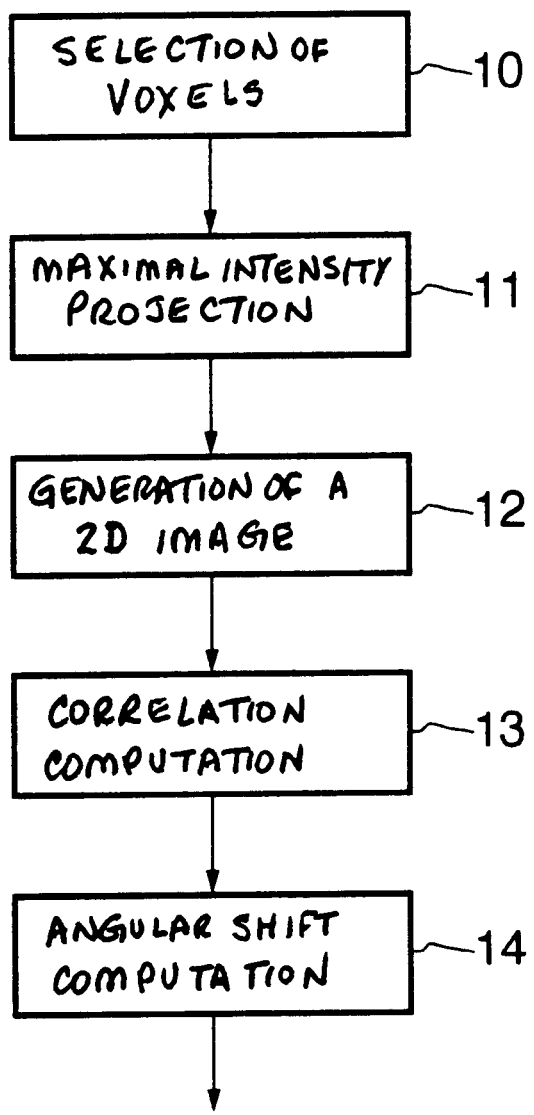
FIG. 3 is a detailed diagram of stage 2 of the previous figures.

In FIG. 3, the substages carried out in stage 2 are illustrated. Stage 2 begins with a substage 10 of selection of certain voxels of the 3DXA image and 3DMR image included within a volume whose definition is identical for the 3DXA and 3DMR images. This volume is delimited by an outer surface referenced 19 in FIG. 5 and by an inner surface referenced 20. The outer surface 19 encompasses the inner surface 20, both surfaces 19 and 20 being capable of possessing common parts. The point of correspondence 21 lies within the volume and can also lie within surfaces 19 and 20. It is understood here that the volume embraces the points of surfaces 19 and 20 defining it.

Let us suppose that we know a pair of homologous points in both modalities: $P_r$ in the 3DXA modality and $P_f$ in the 3DMR modality. If these points are known with extreme precision, the translation is entirely determinate (T=Pr–Pf) and only the rotation R remains unknown.

Now, any sphere centered on the fixed point is rotation-invariant. Any set of points situated between two spheres centered on the fixed point is likewise rotation-invariant. On the other hand, the position of the points situated close to the center of rotation is not very sensitive to the amplitude of rotation. The idea is therefore to consider only the points situated between a minimum distance $R_{max}$ and a maximum distance $R_{max}$ from the fixed point. The minimum distance defining the inner surface 20 ensures that the points considered will produce significant information for characterizing the rotation. The maximum distance defining the outer surface 19 limits the set of points inside the brain-pan. The set of voxels between surfaces 19 and 20 is called crown.

Figure 5:
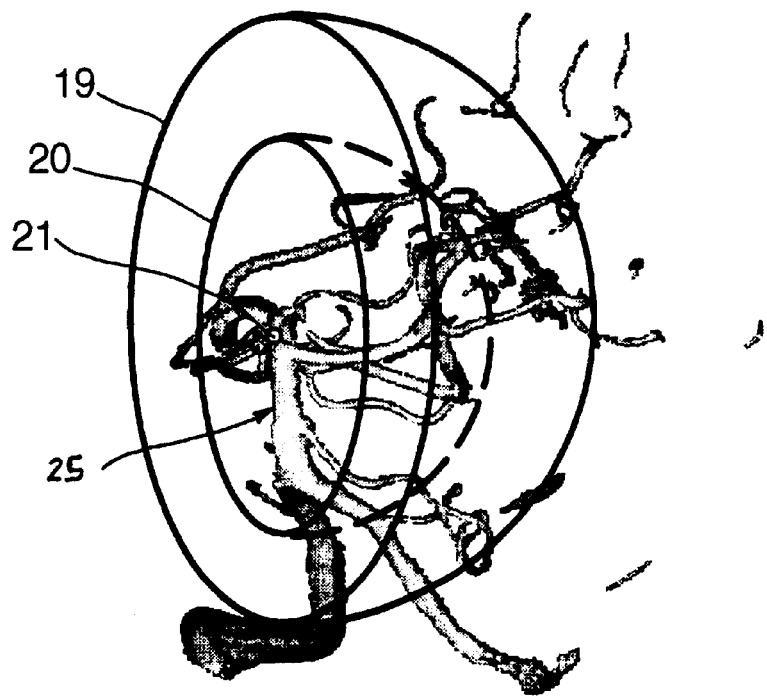
FIG. 5 is a view in perspective of the spheres used for projection of a first image, according to an embodiment of the invention.

For example, in FIG. 5 it can be seen that surfaces 19 and 20 comprise a hemispheric part of different radii and a circular plane closing the half-sphere which is centered on the point of correspondence 21.

In a preferred variant to be explained later with reference to FIG. 7, surfaces 19 and 20 comprise a spherical part greater than half of a sphere and a truncated cone-shaped part, the vertex of the cone being merged with the point of correspondence 21, the same as the center of the sphere, the intersection of the cone and sphere defining a small circle of the sphere and the base of the truncated cone. The cone is common for both surfaces 19 and 20.

In fact, the sinuses, situated behind the nose, show a gain of contrast on a gadolinium-injected MRI examination. A large hypersignal zone is therefore present in the MRI volume. This zone constitutes a pole toward which the arteries, also on hypersignal, can be attracted. This zone is eliminated automatically by removing a cone from the crown. The crown is then said to be truncated, but that does not at all challenge the principle of MIP projection.

The truncated cone is extracted in each modality and then projected on the outer surface. Rotation can then be resumed by turning the surface extracted from the MRI around its center and evaluating the superposition with the extracted surface of the 3DXA. This process compares two surfaces, that is, two sets with two dimensions. We can then pass through a representation in the plane in order to accomplish it.

For example, the cone can present an aperture angle of 600. In other variants, it could be arranged for surfaces 19 and 20 to be defined by a not constant function of angles that form a given point relative to the axes of a three-dimensional mark whose origin is the point of correspondence 21.

In substage 11, a maximum intensity projection is made of the voxels selected on the outer surface 19. In other words, by taking a ray having the point of correspondence 20 as origin and intersecting the outer surface 19, the intensity value taken for the voxel situated at the intersection of the ray and outer surface 19 is the intensity of the voxel, among the voxels of the truncated crown, of greater intensity situated on the ray.

The number of voxels is thus automatically reduced without losing important information on the rotation. The arteries appear in both modalities in hypersignal. The rest of the voxels can be likened to noise: no correspondence exists that could be taken advantage of as to the intensity of the voxels outside the arteries. An extra stage could then be crossed toward simplification of the data by radial maximum intensity projection (MIP) toward the outer surface.

The maximum distance then plays an important role. Giving it a limited value makes it possible to prevent skin areas from intersecting the crown. The skin presenting a hypersignal, that would result in creating a white spot on the surface of the outer sphere after the MIP projection, a spot which would not have its equivalent in 3DXA. A portion of the arteries would be embedded in that spot and, consequently, a part of the pertinent information for registration would be lost.

Likewise, choosing a value of too little minimum distance would give inordinate space for the vessels close to point 21. At the limit, it is sufficient to imagine what would be given by the MIP projection of a crown whose $R_{min}$ was fixed at 1 voxel, if the center point is situated inside an artery: a hypersignal value is found in all directions. The image projected on the outer surface is therefore uniformly white and thus unusable.

Figure 8:
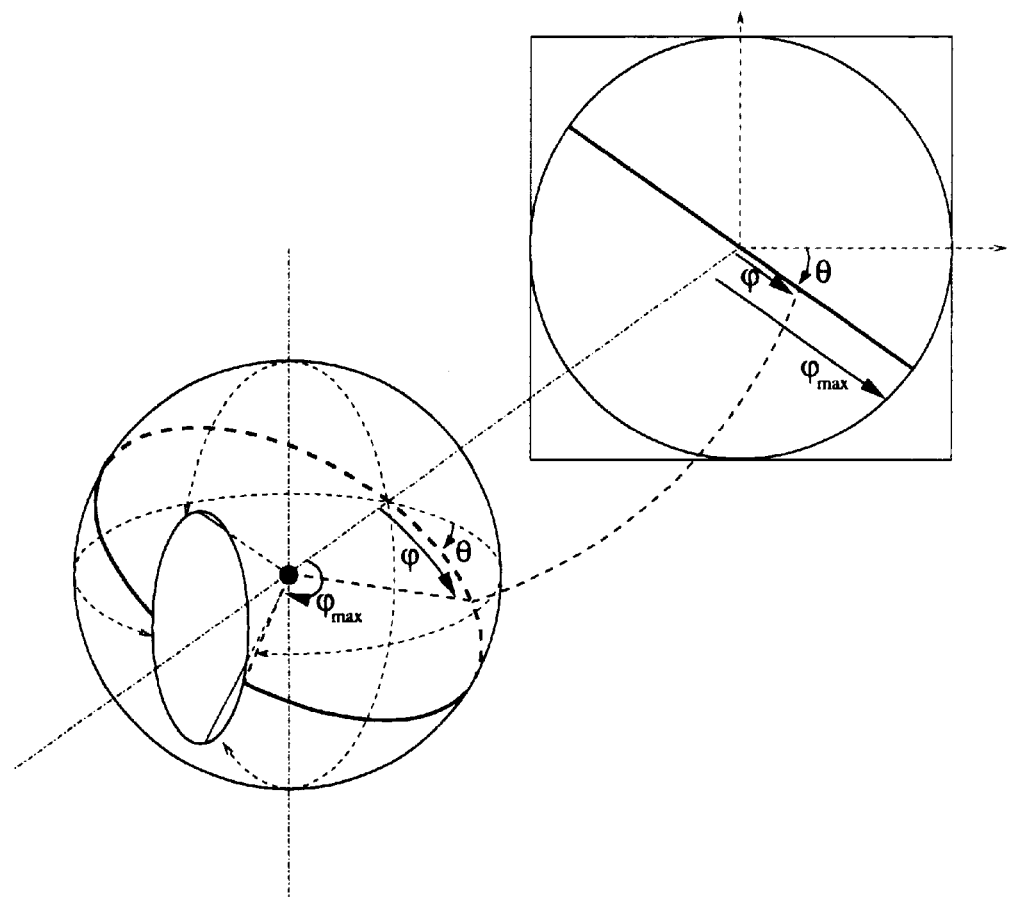
FIG. 8 is a plane representation of the truncated crown.

In substage 12, the voxels calculated in stage 11 are projected on a plane in a three-dimensional mark, the origin of which is the point of correspondence 20 (see also FIG. 8).

The surface is therefore described by two angles: $\theta$ which varies from $\pi$ to $+\pi$ on axis [Oy]; $\phi$ which varies from 0 (alignment with axis [Oy] in the negative direction) to $\phi_{max}$, so that $\pi-\phi_{max}$ is the angle at the vertex of the cone cut off from the surface.

The plane representation can be obtained by using those two variables as polar coordinates in the image plane: $\theta$ is the polar angle and $\phi$ is the modulus. If we took the entire crown ($\phi_{max}$=180 degrees), the sinuses would appear as a white band on the periphery. This band is of no use and is potentially disturbing, lying in the same range of intensity as the arteries. Finally, the truncation reduces the size of the crown, while preserving the useful voxels, improving the processing time accordingly.

On a point P=(x, y, z) situated on the outer surface, we can roughly go back to the case of the unit sphere by standardizing P. The cylindrical angles $\phi$ and $\theta$ are linked to the Cartesian coordinates by the formulas:

$$\begin{cases} x = \sin\varphi\cos\theta \\ y = -\cos\varphi \\ z = \sin\varphi\sin\theta \end{cases} \quad (1)$$

The angle $\phi$ being in the interval $[0,\pi]$, the preceding formulas can be inverted without difficulty:

$$\begin{cases} \varphi = \arccos - y \\ \cos\theta = \dfrac{x}{\sin\varphi} \\ \sin\theta = \dfrac{z}{\sin\varphi} \end{cases} \quad (2)$$

This formula forces $\phi$ to be positive.

Passage into the image plane is then easy. Let us note (u, v) the coordinates in pixels of the point corresponding to P(u=v=0 in the upper left corner of the image). Let us consider that the image is of N×N pixels size; the formula of passage of the sphere to the image is then:

$$\begin{cases} u = \dfrac{N}{2}\left(1 + \dfrac{\varphi}{\varphi_{\max}}\cos\theta\right) \\ v = \dfrac{N}{2}\left(1 - \dfrac{\varphi}{\varphi_{\max}}\sin\theta\right) \end{cases} \quad (3)$$

In case $\phi$ is nil (x=z=0 and y=-1), the cosines and sines of $\theta$ are indefinite, but their product by ($\phi$=0 in the preceding formula places (u, v) in the center of the image.

Let us now consider a point of the image (u, v). It will have a corresponding point on the sphere if and only if it is within the disk forming the trace:

$$\exists\, P \text{ on the truncated sphere} \Leftrightarrow \left\{\rho^2 = \left(\dfrac{2u}{N}-1\right)^2 + \left(\dfrac{2v}{N}-1\right)^2\right\} < 1 \quad (4)$$

where p is positive.

If this condition is fulfilled, we can extract the angles describing the sphere:

$$\begin{cases} \varphi = \rho\varphi_{\max} \\ \cos\theta = \dfrac{1}{\rho}\left(\dfrac{2u}{N}-1\right) \\ \sin\theta = \dfrac{1}{\rho}\left(\dfrac{2v}{N}-1\right) \end{cases} \quad (5)$$

The coordinates of point P of the external sphere corresponding to the pixel (u, v) are easily found. It is to be noted that if p is nil, then so is $\phi$ as well as its sine. The cosine and the sine of $\theta$ are not defined, but that does not at all matter, for formula (1) gives x=z=0.

Let a rotation, given by a 3×3 R matrix, now be applied to the truncated cone. For any point (u, v) satisfying condition (4), a corresponding point P on the sphere can be found by application of the inverse formulas (5) and then (1). That point P is transformed into P' by rotation R (P'=R(P-P$_f$)+P$_f$). The point P' also belongs to the sphere, the latter being wholly invariant on rotation. Application of the direct formulas (2) and then (3) gives the location of the pixel (u', v') corresponding to point P'. The relation between (u, v) and (u', v') is thus determined. All the formulas used were bijective. The effect of a rotation is therefore a bijection of the plane of the image in itself. Thus work proceeds in a space with two dimensions instead of three. The edge effects due to the points entering (P') and leaving (P) the conical zone can be detected according to condition (4) and be roughly treated.

The projection can also be made by considering that the different voxels are projected, for a given plane, parallel to one another and parallel to a straight line perpendicular to the plane. However, this projection technique limits the choice of surfaces 18 and 19 to a half-sphere or, in general, to a surface delimited by a plane comprising the point of correspondence 20 and parallel to the plane on which it is projected.

A different projection technique may be used, corresponding somehow to developing the surface 18 on the plane on which it is projected. A simple example of such a method is that a voxel of spherical coordinates (p, $\theta$, $\phi$) will have for Cartesian coordinates ($\theta$,$\phi$) in the plane on which it is projected. In other words, a Cartesian coordinate of a projected pixel is a linear function of the end of substage 12, one thus obtains a two-dimensional image secured by projection in the three-dimensional mark, for each of the 3DXA and 3DMR three-dimensional images of origin.

This representation seems well suited to the problem: to represent $\theta$ and $\phi$ no longer as polar coordinates, but as Cartesian coordinates (the axis of the growing $\theta$s following the lines of the image and the axis of the growing $\phi$s following the columns). The formulas of transformation into the image plane are simple (translations, except for the rotation on axis [Oy] which is somewhat more complex. However, a certain continuity is lacking for this type of representation: the pixels situated on the vertical edges of the images would pass from one side to the other under the effect of a rotation following $\theta$. But the most serious problem is that this representation distorts the vascular structures, depending on their orientation. This representation proves to be a solution for accelerating the time of calculation of the algorithm, but the representation that we can by comparison describe as "polar" is prefer ed to the representation we shall then call "Cartesian," because it hardly distorts the structures and produces images which can easily be interpreted: everything happens as if the observer were situated in the center of the spheres and possessed a view over $2\phi_{max}$ degrees.

In substage 13, the correlation between both two-dimensional images projected with zero angular displacement is calculated; in other words, the correlation between the two-dimensional image coming from the 3DXA image and the two-dimensional image coming from the 3DMR image is calculated. A cross-correlation obtained by multiplying the intensity values of the pixels of both two-dimensional images can be used for that purpose.

A correlation value for the same two-dimensional images is then calculated in the same way, but displaced from one another by a certain angle along one of the axes of the three-dimensional mark. This same calculation is repeated for a negative displacement of the same angle along the same axis.

The same calculations are then made for displacements along the two other axes. The seven correlation values obtained for a two-dimensional image are compared and the displacement affording the greatest correlation between both two-dimensional images is taken, one originating from the 3DXA image and the other from the 3DMR image.

Three potentially disturbing problems can be observed for comparison of the images:

the bottom of the 3DMR image is not uniform, with, in particular, wide hypersignal zones due to the large arteries and to the sinuses (lower part of the image) and light spots here and there in the image;

the diameter of the arteries is not exactly the same; problems of resolution in the MRI volume appear;

not all the arteries visible in 3DXA are in the 3DMR image and, above all, vessels (notably veins) are added to the major arteries in the 3DMR image. To enhance the vessels, a simple morphological operator called "Top-Hat" is used. As a reminder, it is simply a question of an opening, followed by a subtraction of the image opened on the original image. The structural element is a disk centered on the pixel of interest and whose radius is going to depend on the size of the arteries we want to retain. Positively, if we want to retain all the arteries whose diameter does not exceed d millimeters, the diameter D of the structural element will be determined by:

$$D = \frac{d/R_{min}}{\varphi_{max}/N} \quad (6)$$

where $d/R_{min}$ is the maximum angle at which a length equivalent to the width of the arteries to be retained is seen and $\phi_{max}/N$ is the angular size of a pixel of the image of plane representation. This operator is applied to both images (3DXA and 3DMR).

Beside the second problem, the morphological operator more strongly reveals the intensity variations present in the MRI: instability of intensity along an artery and weaker intensity for the smaller caliber arteries. We employ a criterion of standardized and centered intercorrelation, this time in relation to the local average of the images (in practice, a square neighborhood of 15 pixels per side is used).

Finally, the last problem is solved by initializing the rotation parameters by a phase of exhaustive search of the maximum low resolution criterion, which makes it possible to avoid the local maxima.

Other standard similarity criteria can clearly be envisaged in place of correlation: mutual information or correlation ratio, for example.

In substage 14, from the different displacement values taken in substage 13 to supply the strongest correlation between the two-dimensional images, one calculates the angular displacement between the 3DXA and 3DMR three-dimensional images corresponding to the displacement obtained at the end of substage 13.

Let us now assume that we know the rotation perfectly, but that the pair of homologous points $(P_r, P_f)$ is known approximately. We still have an estimate of the translation (T=Pr−Pf), but the latter is now approximate and needs to be refined.

There is no need to know the entire volume to determine a translation. A correctly chosen subvolume suffices, the effect of the translation being the same at any point of the volume (in contrast to rotation, the amplitude of transformation does not depend on the zone observed). Let us therefore require those paired points to be in the neighborhood of an arterial structure not presenting any invariance by translation; in other words, the structure must open up in three dimensions: a typical example being a bifurcation in which the three arteries take very different directions. The translation can then be estimated by bringing those point opposite the neighborhoods.

Figure 4:
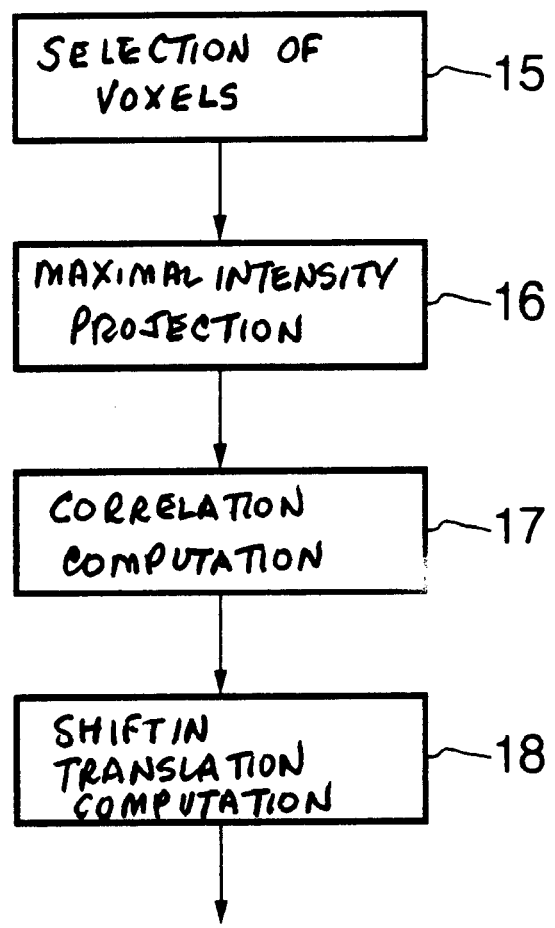
FIG. 4 is a detailed diagram of stage 3 of FIGS. 1 and 2.

In FIG. 4, substages 15 to 18 of stage 4 are illustrated.

In substage 15, one selects the voxels of each 3DXA, 3DMR three-dimensional image included within a parallelepiped, for example, a cube of given dimensions, centered on the point of correspondence 21. A cube of 16 mm per side can be chosen, which corresponds approximately to the size of 64 voxels in 3DXA.

In substage 16, three projections are made, each along an axis of the same three-dimensional mark. Each face of the cube may advantageously be perpendicular to an axis of the three-dimensional mark. Each projection is made by retaining, for a given line fo voxels, the intensity value of the voxel presenting the maximum intensity. Thus, if the voxel of Cartesian coordinates $x_1$, $y_1$, $z_1$ presents the strongest intensity of the whole parallelepiped selected in stage 15, that same intensity value will be encountered in the two-dimensional images projected with the following coordinates:

$x_1$, $y_1$ for the image perpendicular to axis Z and the voxels of which were projected along the axis Z, $(x_1, z_1)$ in the two-dimensional image obtained by projection along axis Y, and $(y_1, z_1)$ in the two-dimensional image obtained by projection along axis X.

At the end of substage 16, for each 3DXA and 3DMR three-dimensional image, three 2DXAP and 2DMRP projected two-dimensional images are obtained.

In substage 17, the correlation is calculated between both 2DXAP and 2DMRP images projected along axis X with zero displacement. That same calculation is then made for the same images displaced by a given number of pixels, for example +4, and then the same calculation is made for the same images negatively displaced by the same given number of pixels, for example, −4. The same calculations are made with the 2DXAP and 2DMRP images projected along axis Y, and then those projected along axis Z.

The images of each pair of homologous images (axial, sagittal and coronal) are compared by the criterion of standardized centered correlation. The size of the subcube being reduced, those images all present an almost uniform background, even in MRI. Centering is therefore done in relation to the average pixel situated in the zone common to both images, Standardization makes it possible to reinforce the strength for a small-sized common zone.

A low correlation criterion resulting from the average of three scores is used: a high score in at least two images leads to a high criterion.

Considering the low resolution of the MRI in relation to the 3DXA, and, therefore, the high level of interpolation present in the MIP images of the subcube extracted from the MRI, as well as the possibility of artifacts (due, for example, to the flux) in the MRI, that low criterion makes it possible not to be penalized by these inaccuracies.

In substage 18, the average correlation obtained in substage 17 is calculated for each displacement, namely, zero displacement, positive on the axis of the Xs, negative on the axis of the Xs, positive on the axis of the Ys, negative on the axis of the Ys, positive on the axis of the Zs and negative on the axis of the Zs. The displacement presenting the maximum average correlation between the 2DXAP and 2DMRP images is then retained.

One then passes to stage 5 of registration by means of the displacement calculated in Cartesian coordinates in substage 18. Limiting the voxels to those contained in a parallelepiped of given dimensions makes it possible to reduce the necessary calculation times markedly.

Preferably, one and the same three-dimensional mark is used for all the stages and substages.

FIG. 5 represents in perspective an example of a 3DXA type three-dimensional image with a network of arteries 25 which are clearly visible due to the injection of a contrast medium. The voxels included between surfaces 19 and 20 are taken from that image, the spherical part of the outer surface 19 presenting a radius of 4 cm and the spherical part of the inner surface 20 presenting a radius of 2 cm. Those radius values are, of course, indicative. They are adapted to a three-dimensional image of the human brain, the large radius of 4 cm avoiding having in the image the structures outside the brain, notably the skin, and the small radius of 2 cm avoiding taking vessels too close to the center of the spheres and which would become too prominent on projection. In the optimization algorithm chosen, it is assumed that rotation and then translation in turn are fully known. When we estimate rotation, it is therefore assumed that the translation error is slight in relation to the rotation error. It can be estimated that this problem of equilibrium between the two errors is encountered especially on initialization, the final pseudo-exhaustive optimization data being slight enough to ignore this problem subsequently. It is therefore assumed that the worst translation error there might be is encountered on manual initialization of points $P_r$ and $P_f$. We have estimated it equivalent to the MRI resolution, i.e., 1 mm. The angle at which such an error is seen from the $R_{min}$ distance is $1/R_{min}$ radians. The initialization of rotation is made with N=64. The angular size of a pixel of the image of the truncated crown is therefore: $2\phi_{max}/N$. It is then necessary to compare $R_{min}$ to $N/2\phi_{max}=12.22$ mm, where $R_{min}=2$ cm.

The two spheres are centered on the point of correspondence 21 determined before introduction of the registration method.

Figure 6:
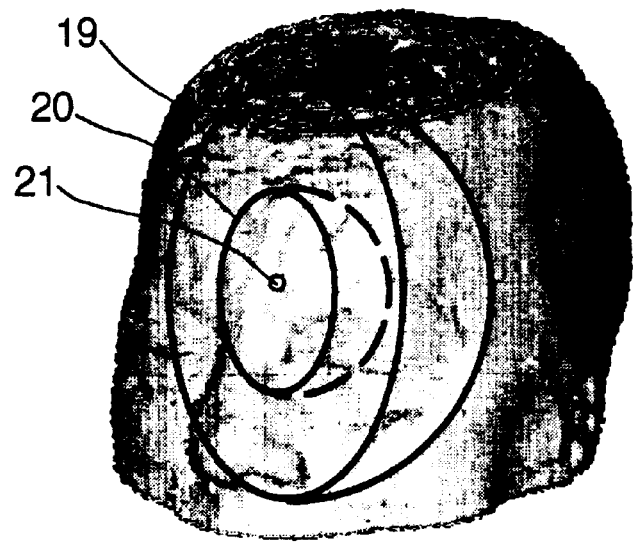
FIG. 6 is a view in perspective of the spheres used for projection of a second image, according to an embodiment of the invention.

FIG. 6 represents a 3DMR type three-dimensional image on which the point of correspondence 21 and the outer surface 19 and inner surface 20 can also be seen. Thus, the same voxels are retained for registration treatment in the 3DXA image and 3DMR images for just edge effects.

Figure 7:
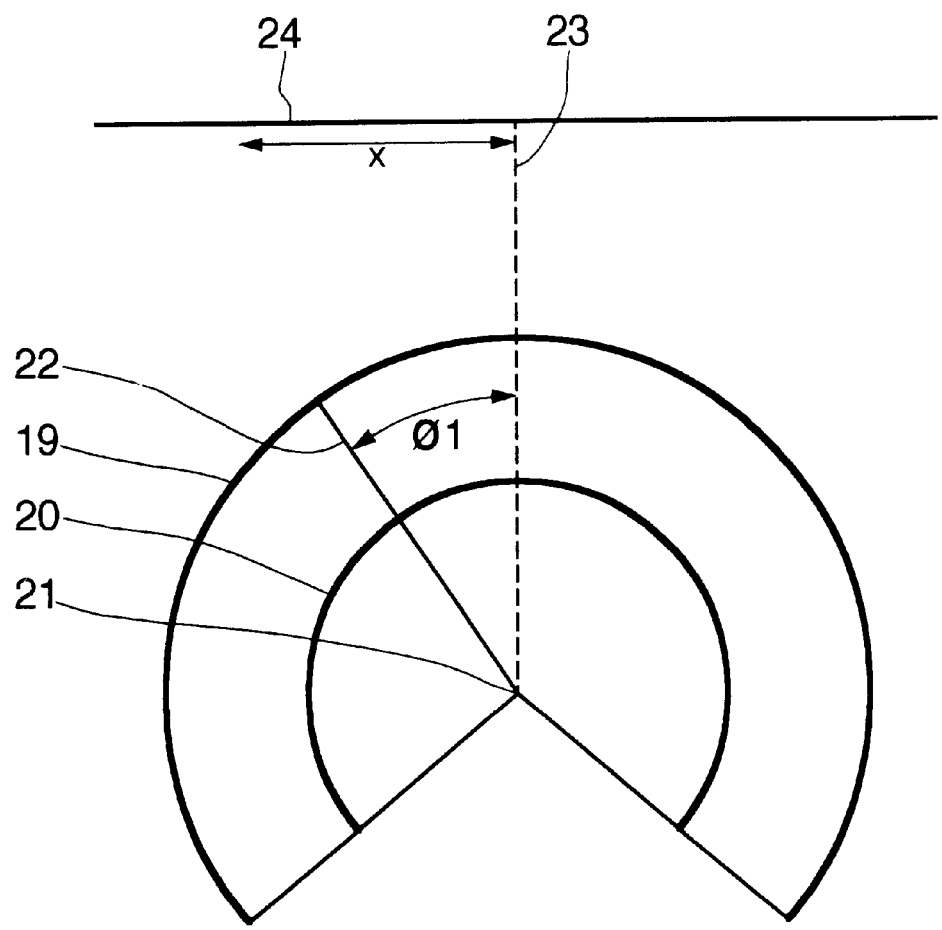
FIG. 7 is a schematic view of a type of projection used.

In FIG. 7, the projection which can be used on the rotation estimate stage is schematically illustrated. The voxels included between the outer surface 19 and inner surface 20 are projected first on the outer surface 19. For example, the ray 22 is represented with an angle $\phi_1$ in relation to the axis of projection 23. All the voxels of coordinate $\phi_1$ are projected on the outer surface 19 by projection of maximum intensity. The strongest intensity value of the voxels of coordinates $\phi_1$ is therefore retained.

The projected voxel of coordinate $\phi_1$ is therefore situated at the intersection of the ray 22 and outer surface 19 and is projected in rotation on the plane 24 on which a two-dimensional image is formed. The projection makes it possible to develop the spherical part of the outer surface 19. In other words, the Cartesian coordinate $x_1$ of the projected voxel corresponding to the voxel of spherical coordinate $\phi_1$ will be such that $x_1$ is proportional to $\phi_1$, in contrast to the standard projection where $x_1$ will be proportional to a sinusoidal function of $\phi_1$.

For translation, the choice of a first proposed displacement of four pixels and then of a reiteration of the stages of estimate of rotation and translation with a proposed displacement of two pixels and then one pixel results from the precision of choice of the point of correspondence in the 3DXA and 3DMR images, which is estimated at between 1 and 2 mm, and of the resolution of the 3DXA image, which is in the order of 0.3 mm. Thus, the finest pixel of a projected two-dimensional image has a size in the order of 0.3 mm. Starting the registration with four pixels, i.e., a displacement of +1.2 mm, then two pixels, i.e., ±0.6 mm, and then one pixel, i.e., ±0.3 mm, one manages at the maximum to make up for a translation error of 2.1 mm, which is widely sufficient compared to the reasonable error that an operator can commit on choice of the point of correspondence.

In FIG. 8, a preferred type of projection called "polar" is illustrated. The angle $\phi$ in spherical coordinates, which lies between $-\phi_{max}$ and $+\phi_{max}$, determines the modulus in polar coordinates.

The invention provides a method of registration of two three-dimensional images, which is rapid and inexpensive, inasmuch as only two-dimensional images are processed, particularly on correlation calculations. Three-dimensional radiology and magnetic resonance images can thus more easily be used on surgical interventions, which improves the safety and effectiveness of such operations.

Various modifications in structure and/or steps and/or function may be made by one skilled in the art without departing from the scope of the invention.

What is claimed is:

1. A method of automatic registration of three-dimensional images for visualization of the blood vessels by comparison of a three-dimensional digital angiography image obtained by means of a radiology apparatus and a three-dimensional digital image obtained by means of a nuclear magnetic resonance apparatus, each three dimensional image being composed of a plurality of voxels, comprising:

from a point of correspondence between the two three-dimensional images, an estimate is made by processing of the projected two-dimensional images of a rotation capable of registering the two three-dimensional images;

where the rotation estimate comprises:

selection of the voxels of each three-dimensional image, lying between an outer surface and an inner surface, both surfaces embracing the point of correspondence;

radial projection on a spherical surface of voxels of maximum intensity among the voxels selected for each three-dimensional image;

generation of a two-dimensional image for each three-dimensional image, by projection on a plane in a three-dimensional mark centered on the point of correspondence in order to flatten the sphere;

calculation of the correlation between the two-dimensional images projected with zero angular displacement, followed by a positive and then negative angular displacement along each axis of the three-dimensional mark; and calculation of the angular displacement between the three-dimensional images corresponding to the displacement presenting the maximum correlation between the two-dimensional images;

one of the two three-dimensional images is registered in relation to the other;

an estimate is made by processing of the projected two-dimensional images of a translation capable of registering the two three-dimensional images; and one of the two three-dimensional images is registered in relation to the other.

2. The method according to claim 1, in which an estimate is made again by processing of the projected two-dimensional images of a rotation capable of registering the three-dimensional image registered in relation to the other three-dimensional image, then the registered three-dimensional image is registered in relation to the other or the reverse, an estimate is made by processing of the projected two-dimensional images of a translation capable of registering the three-dimensional image registered in relation to the other three-dimensional image, and the registered three-dimensional image is registered in relation to the other or the reverse.

3. The method according to claim 2 in which the point of correspondence between the two three-dimensional images is chosen manually or automatically on a blood vessel.

4. The method according to claim 3 in which the point of correspondence between the two three-dimensional images is chosen manually or automatically on a blood vessel.

5. The method according to claim 1 in which the rotation estimate treatment comprises stages of reiteration of the two stages of calculation of correlation and calculation of angular displacement for a lesser displacement.

6. The method according to claim 5 in which the surfaces embrace concentric spherical parts.

7. The method according to claim 6 in which each surface embraces a truncated cone-shaped part, the vertex of the cone being the point of correspondence.

8. The method according to claim 1 in which the surfaces embrace concentric spherical parts.

9. The method according to claim 8 in which each surface embraces a truncated cone-shaped part, the vertex of the cone being the point of correspondence.

10. The method according to claim 1 in which the translation estimate treatment comprises stages of:

selection of voxels of each three-dimensional image, included in a parallelepiped of given dimensions, centered on the point of correspondence;

projection along three axes of a same three-dimensional mark, centered on the point of correspondence, of voxels of maximum intensity among the voxels selected for each three-dimensional image, generating three two-dimensional images for each three-dimensional image;

calculation of the correlation between each pair of two-dimensional images projected along the same axis with zero displacement, followed by a positive and then negative displacement, of a given number of pixels along each axis of the plane of each two-dimensional image;

calculation of the average correlation for each displacement; and calculation of the translation displacement between the three-dimensional images corresponding to the displacement presenting the maximum average correlation between the two-dimensional images.

11. The method according to claim 10 in which the translation estimate treatment comprises stages of reiteration of both stages of calculation of the correlation and calculation of the translation displacement at a lower pitch for a lesser displacement.

12. The method according to claim 10 in which the projection is carried out, for each axis, along straight lines parallel to the axis.

13. The method according to claim 11 in which the projection is carried out, for each axis, along straight lines parallel to the axis.

* * * * *

UNITED STATES PATENT AND TRADEMARK OFFICE
CERTIFICATE OF CORRECTION

PATENT NO. : 6,879,711 B2
DATED : April 12, 2005
INVENTOR(S) : Maurincomme et al.

It is certified that error appears in the above-identified patent and that said Letters Patent is hereby corrected as shown below:

Column 1,
Line 40, after "angiography" delete ",".
Line 40, after "applications" insert therefor -- , --.

Column 4,
Line 26, after "perfect" delete "re gistration" and insert therefor -- registration --.

Column 6,
Line 33, before "In" delete "600." and insert therefor -- $60^0$. --.
Line 39, after "correspondence" delete "20" and insert therefor -- 21 --.

Column 7,
Line 1, after "therefore" delete "uniformiy" and insert therefor -- uniformly --.
Line 55, after "by" delete "(Φ=0" and insert therefor -- $\varphi = 0$ --.

Column 8,
Line 35, after "correspondence" delete "20" and insert therefor -- 21 --.
Line 62, after "is" delete "prefer ed" and insert therefor -- preferred --.

Column 10,
Line 20, after "those" delete "point" and insert therefor -- points --.
Line 33, after "line" delete "fo" and insert therefor -- of --.

Signed and Sealed this

Twenty-seventh Day of September, 2005

JON W. DUDAS
*Director of the United States Patent and Trademark Office*